Figure 1:
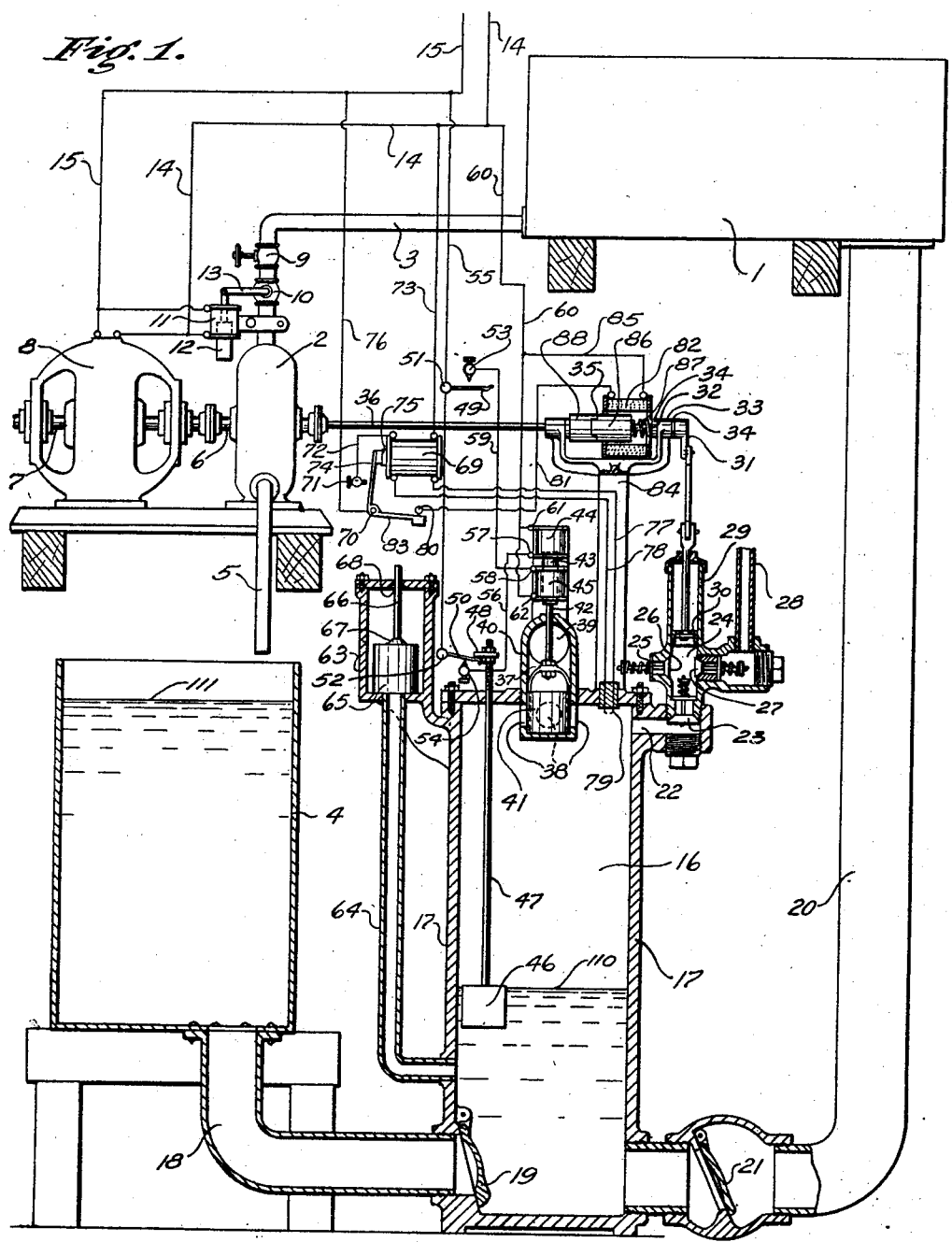

No. 722,328. PATENTED MAR. 10, 1903.
C. H. ROTH.
MOTOR.
APPLICATION FILED JAN. 4, 1902.
NO MODEL. 2 SHEETS—SHEET 1.

WITNESSES: INVENTOR.
F. J. von Aubade Charles H. Roth
Blanche Michael BY
Rummler & Rummler
his ATTORNEYS.

THE NORRIS PETERS CO., PHOTO-LITHO., WASHINGTON, D. C.

No. 722,328. PATENTED MAR. 10, 1903.
C. H. ROTH.
MOTOR.
APPLICATION FILED JAN. 4, 1902.
NO MODEL. 2 SHEETS—SHEET 2.
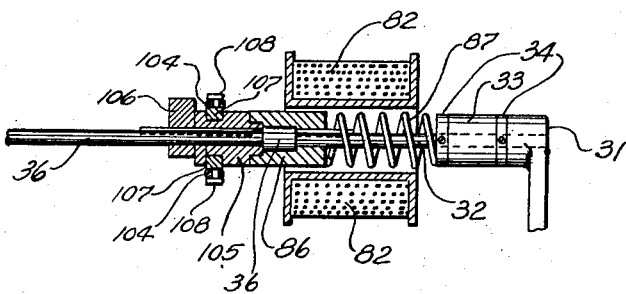
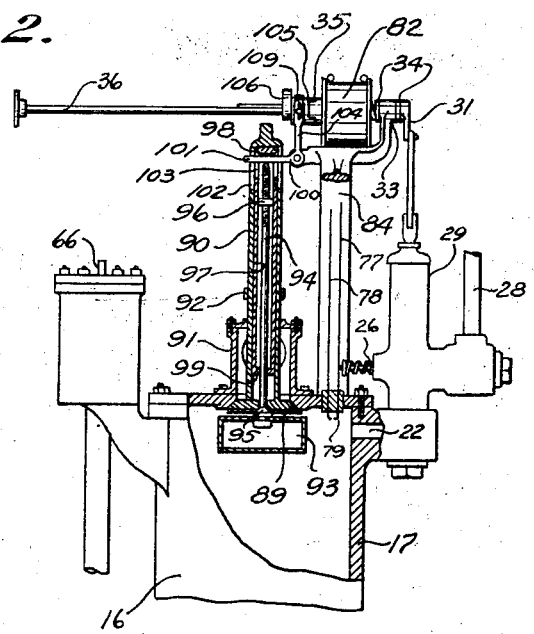
WITNESSES:
INVENTOR.
BY
ATTORNEYS.

UNITED STATES PATENT OFFICE.

CHARLES H. ROTH, OF CHICAGO, ILLINOIS.

MOTOR.

SPECIFICATION forming part of Letters Patent No. 722,328, dated March 10, 1903.

Application filed January 4, 1902. Serial No. 88,395. (No model.)

*To all whom it may concern:*

Be it known that I, CHARLES H. ROTH, a citizen of the United States of America, and a resident of Chicago, in the county of Cook and State of Illinois, have invented certain new and useful Improvements in Motors, of which the following is a specification.

The main object of my invention is to provide an improved power plant which is comparatively inexpensive and requires but little attention, so that same may be used to operate a small electric-lighting system, as for a private residence, or to furnish other power.

A further and incidental object is to provide an improved form of gas-driven motor which is substantially self-governing and suitable for accumulating hydraulic power.

I accomplish these objects by the device shown in the accompanying drawings, in which—

Figure 1 is an elevation, partly in section, of a device constructed according to my invention. Fig. 2 is a modified form of mechanism for operating the exhaust-valve of the pump shown in Fig. 1. Fig. 3 is an enlarged sectional view of the clutch 35 of Fig. 2.

The electrical connections in the drawings are shown in diagram, and their supports are omitted for the sake of simplicity.

The device shown consists of an elevated tank 1 or accumulator arranged to supply water under pressure. Water is conducted from the pressure-tank 1 to the water-motor 2 by means of a pipe 3 and is delivered from said motor to the supply-tank 4 by means of the pipe 5. The shaft 6 of the water-motor is directly connected to the shaft 7 of the dynamo 8. The pipe 3 is provided with a throttle-valve 9 and also with a governing-valve 10, which is controlled by the solenoid 11. The armature 12 of the solenoid 11 is connected to the controlling-lever 13 of the valve 10 in such manner that the weight of the armature 12 will tend to open the valve 10. The dynamo 8 causes an electric current in the wires 14 and 15, and the solenoid 11 is connected to said wires in such manner as to receive current from the dynamo. The electric current passing through the solenoid 11 will tend to lift the armature 12, and thereby close the valve 10. The valve 10 will therefore act as a governor and regulate the power of the water-motor 2, so as to be equal to that required by the dynamo 8.

The pump 16 consists of a vertically-disposed cylindrical receptacle 17, which is adapted to contain a gas or liquid under high pressure. The inlet-pipe 18 connects the tank 4 with the receptacle 17 and is closed by a check-valve 19, which permits the flow of water toward the receptacle 17, but prevents a return-flow. The receptacle 17 is also connected at its lower end to the pressure-tank 1 by means of the delivery-pipe 20, which is also provided with a check-valve 21, adapted to permit the water in said pipe to flow only to the direction of said pressure-tank. The upper end of the receptacle 17 is provided with a gas-port 22, through which gas may be admitted to the interior of said receptacle. The check-valve 23 prevents the contents of the receptacle from escaping at the port 22. The port 22 connects with the mixing-chamber 24. Air is admitted to the mixing-chamber through the port 25, which is controlled by the check-valve 26. Gas enters the mixing-chamber 24 through the valve 27, which connects with the gas-supply pipe 28. The pump 29 connects with the mixing-chamber 24 and is provided with a piston 30, by means of which air and gas are drawn into the mixing-chamber 24 and forced through the port 22 into the receptacle 17. The pump 29 is operated by the crank 31, which is mounted on the shaft 32. The shaft 32 is journaled at 33 and secured against longitudinal movement by the collars 34. The shaft 32 is connected, by means of the clutch 35 and the shaft 36, to the shaft 6 of the water-motor 2.

The upper end of the receptacle 17 is provided with an exhaust-port 37, which communicates with the exhaust-pipe 39 and also with the interior of the receptacle 17 by means of the openings 38. The exhaust-port consists of a cylindrical shell 40 and a piston-valve 41, which fits the interior of the shell 40 and is longitudinally slidable therein. The movement of the piston 41 is controlled by the piston-rod 42. At the upper end of the piston-rod 42 is an armature 43, which, in conjunction with the solenoids 44 and 45, raises or lowers the piston 41 as an electric current passes through the solenoids 44 and 45, respectively. A float 46 is supported by the surface of the water within the receptacle 17. The float 46 is secured to the lower end of the rod 47, which passes through the top of the receptacle 17 and carries at its upper end a projecting shoulder 48. The shoulder 48 is adjustable along the rod 47. Horizontally-disposed springs 49 and 50 are secured at 51 and 52. A contact-point 53 is secured in a position slightly above the spring 49, and a contact-point 54 is secured below and in a similar relation to the spring 50. The wire 55 connects the springs 49 and 50 with the wire 15. The contact-point 54 is connected, by means of the wire 56, to the binding-post 57 of the solenoid 44. The contact-point 53 is connected to the binding-post 58 of the solenoid 45 by means of the wire 59. The wire 60 connects the binding-posts 61 and 62 of said solenoids to the wire 14.

At one side and slightly elevated above the receptacle 17 is an auxiliary cylinder 63, which is connected to the lower part of the receptacle 17 by means of the pipe 64. A float 65 is disposed within the cylinder 63 and has rigidly secured thereto the guide-rod 66, which passes loosely through the upper end of the cylinder 63. The lower end of the rod 66 at its point of junction with the float 65 forms a conical shoulder 67, which is adapted to tightly close the opening 68 in the top of the cylinder 63 when the float 65 is in its uppermost position.

An induction-coil 69 is secured above the cylinder 63. Pivoted near one end of the induction-coil 69 is a bell-crank lever 70. A contact-point 71 is secured in about the position shown in Fig. 1 and is connected by the wire 72 to one end of the primary coil of said induction-coil. The other end of the primary coil is connected by the wire 73 to the wire 14 of the main line. The arm 74 of the bell-crank lever is made of resilient material and is adapted to vibrate between the contact-point 71 and the core 75 of the induction-coil 69. The wire 76 connects the bell-crank lever 70 with the wire 15 of the main line. The secondary coil of the induction-coil 69 is connected with the wires 77 and 78, which terminate in sparking-points 79 in the upper end of the receptacle 16. A contact-point 80 is connected by the wire 81 to the solenoid 82 and is so located that when the piston-rod 66 is in its uppermost position the arm 83 of the bell-crank lever will have been pushed by the piston-rod 66 into contact with the contact-point 80. The other arm 74 of said bell-crank lever 70 will at the same time be brought into contact with the contact-point 71. The solenoid 82 is secured to the frame 84 concentrically with the shaft 32, and one end of the coil is connected to the contact-point 80 by the wire 81, while the other end is connected to the wire 60 by the wire 85. The member 86 of the clutch 35 is splined to the shaft 32 and is held, by means of the spring 87, in contact with the member 88, which is keyed to the shaft 36.

In the modification shown in Fig. 2 the exhaust-valve 89 is operated by mechanical means instead of by the electrical means shown in Fig. 1. Rigidly secured to the top of the valve 89 is a tubular shank 90, which extends through the top of the casing 91. The shoulder 92 on the shank 90 is adapted to engage the casing 91 and limit the downward movement of the valve 89. A float 93, which is supported by the surface of the liquid within the receptacle 16, is rigidly connected to the rod 94, which passes loosely through the valve-plate 89. The rod 94 is provided with a conical shoulder 95, which is adapted to close the opening in said valve-plate. The upper end of the rod 94 is threaded and carries thereon a nut 96, which is adjustable along said rod. Fitting within the shank 90 and longitudinally slidable therein is a tubular member 97, having a shoulder 98 extending across its upper end and having a shoulder 99 at its lower end adapted to engage the nut 96 on the rod 94. A bell-crank lever 100 is pivoted in the frame 84 and is so disposed that its horizontal arm 101 extends through the slots 102 and 103 in the shank and member 97. The arm 104 of the bell-crank lever 100 extends upwardly and is forked and slotted, so as to connect with the member 105 of the clutch 35. The member 105 has rigidly secured thereto the cam 106 and is splined to the shaft 36, so as to be revoluble therewith and slidable thereon. A collar 107 is seated in an annular recess in the member 105 and is provided with arms 108, which engage the slots 109 of the bell-crank lever 100.

The operation of the device shown is as follows: Assume, for example, that the various parts of the mechanism are in the position shown in Fig. 1, that the surface of the water in the receptacle 16 is at 110, and that both of the tanks 1 and 4 contain water, except that the valve 41 is in its uppermost position and the exhaust-port 37 is open, and the valve 9 is open, so as to operate the water-motor 2. The dynamo 8 will be driven by the water-motor and an electric current will be caused to pass along the wires 14 and 15. The water discharged from the water-motor 2 will enter the tank 4 and will fill the receptacle 16 and accumulate in the tank 4. When the water in the tank 4 reaches the level 111, the receptacle 16 will have become filled with water and the float 46 will be in its uppermost position. The shoulder 48 will engage the spring 49 and push same against the contact-point 53, thus closing an electric circuit and causing a current to pass through the solenoid 45. The action of the solenoid 45 will draw the armature 43 into the position shown, thus causing the valve 41 to close the exhaust-openings 38. Since the spring 87 holds the clutch 35 in its closed position, the pump 29 will be operating at this time, and gas and air will be drawn in the mixing-chamber 24 and forced through the valve 23 into the receptacle 16. The gas passes from the pipe 28 through the valve 27, while air enters through the valve 26. The mixed air and gas will accumulate in the receptacle 16 until it has sufficient pressure to raise the float 65 to the upper end of the cylinder 63, when the opening 68 will be closed by the valve 67, and the rod 66 will force the bell-crank lever 70 into contact with the contact-points 71 and 80, thus closing the circuit, which includes the solenoid 82, and also closing the primary circuit in the induction-coil 69. The current in the solenoid 82 withdraws the member 86 of the clutch 35 from its contact with the member 88, and thereby stops the action of the pump 29. The primary circuit of the induction-coil 69 magnetizes the core 75, causes the arm 74 to vibrate, and induces currents in the secondary coil, which cause a series of sparks to be emitted at 79. The explosive mixture within the receptacle 16 is ignited by said sparks and expands, causing the surface of the water in said receptacle to be pushed down and forcing some of said water through the valve 21. The valve 19 prevents the escape of water into the pipe 18, and the valve 21 prevents the return of any water which may have entered the pipe 20. When the level of the water in the receptacle 16 has been lowered slightly below that shown by the line 110, the shoulder 48 will force the spring 50 against the contact-point 54 and cause an electric current to pass through the solenoid 44. This will draw the armature 43 upwardly and raise the piston 41. The burned gases will pass through the openings 38, then up through the piston 41, and escape into the exhaust-pipe 39. As soon as the pressure within the receptacle 16 is released the float 65 will fall to the position shown in Fig. 1. Water from the tank 4 will now enter the receptacle 16 and when same has become entirely filled the operation described will be repeated.

The solenoid 11 is connected to the wires 14 and 15 by a shunt-circuit, and its action will depend upon the electric pressure at the dynamo 8. Thus if the electric pressure at the dynamo increases the armature 12 of the solenoid 11 will be pulled up and will tend to close the valve 10, and if the electric pressure at the dynamo decreases the armature 12 will fall and tend to open the valve 10. The solenoid 11 therefore acts as a governor and automatically adjusts the power of the water-motor 2 to conform with the load upon the dynamo 8.

In the modified form shown in Figs. 2 and 3 the solenoid 82 and the member 86 of the clutch 35 operate in the manner which has been hereinbefore described. As the receptacle 17 fills with water the float 93 is carried upwardly and closes the valve 89. The rod 94 engages the clutch members 86 and 105 into engagement with each other. This starts the action of the pump 29, and when the gas within the receptacle 17 acquires sufficient pressure the float 65 will rise and forcing the arm 83 of the bell-crank lever 70 against the contact-point 80 will cause an electric current to pass through the solenoid 82 and stop the action of the pump 29. Ignition now takes place, as before, and the gas again expands. As the liquid-level in the receptacle 17 falls the float 93 moves downwardly until the nut 96 engages the shoulders 99 of the member 97 and drawing same downwardly turns the bell-crank lever 100 and throws the clutch member 105 to the left of the position shown in Fig. 2 and out of engagement with the member 86. When the cam 100 comes into alinement with the shank 90, it will press downwardly upon said shank and open the valve 89, thus permitting the escape of the exhaust-gases. The shoulder 92 of the shank 90 limits the downward movement of the valve 89.

It will be seen that numerous details of the device shown may be altered without departing from the spirit of my invention. I therefore do not confine myself to such details except as hereinafter limited in the claims.

What I claim as my invention, and desire to secure by Letters Patent, is—

1. The combination of a liquid-receptacle; an inlet adapted to conduct liquid to said receptacle; means for preventing the return-flow of said liquid; an outlet adapted to discharge said liquid from said receptacle; means for preventing the return-flow of said liquid through said outlet; suitable means for admitting gas to said receptacle; means for igniting said gas when a certain quantity of same has entered said receptacle and thereby causing same to expand and force some of the liquid out of said receptacle; an exhaust-valve in the upper part of said receptacle; a float supported by the liquid in said receptacle; and means controlled by the rising and falling of the float and adapted to open said exhaust-valve when the liquid-level has been lowered to a certain point in the receptacle, and to close said exhaust-valve when said liquid has returned to a certain higher level in said receptacle.

2. The combination of a liquid-receptacle; a liquid-supply communicating therewith; means for preventing a return-flow of liquid from said receptacle to said liquid-supply; a liquid-outlet in said receptacle; means for preventing a return-flow of said liquid through said outlet; a gas-supply communicating with said receptacle; means for igniting the gas and causing its expansion in said receptacle; means controlled by the level of the liquid in said receptacle for permitting the escape of the expanded gas after the liquid-level has been lowered through such expansion.

3. The combination of a liquid-receptacle having an inlet and an outlet for the liquid; a gas-supply communicating with said receptacle; means for igniting the gas and causing its expansion in said receptacle and thereby lowering the liquid-level in said receptacle; means controlled by the level of the liquid in said receptacle for permitting the escape of the expanded gas after the liquid-level has been lowered through such expansion.

4. The combination of a liquid-receptacle having an inlet and an outlet for the liquid; a gas-supply communicating with said receptacle; means for igniting the gas and causing its expansion in said receptacle and thereby lowering the liquid-level in said receptacle; an exhaust-valve in the upper part of said receptacle; a float supported by the liquid in said receptacle; electromagnetic means connected to said float and coacting with same for controlling the operation of said exhaust-valve.

5. The combination of a liquid-receptacle having an inlet and an outlet for the liquid; suitable means for admitting gas to said receptacle; electromagnetic means for automatically controlling the admission of said gas; means for igniting said gas and causing same to expand and thereby lower the liquid-level in said receptacle; an exhaust-valve in the upper part of said receptacle; a float supported by the liquid in said receptacle; means connected with said float and adapted to open said exhaust-valve when the surface of said liquid has been lowered to a certain point in said receptacle; and means for closing said exhaust-valve when said liquid has returned to a certain higher level in said receptacle.

6. The combination of a liquid-receptacle having an inlet and an outlet for the liquid; suitable means for admitting gas to said receptacle; means for controlling the admission of said gas; an auxiliary cylinder connected with said receptacle and extending a considerable distance above same; a float supported by the liquid in said auxiliary cylinder; suitable connection between said float and said gas-controlling means, so arranged that the admission of gas will depend upon the position of said float; means for igniting said gas and causing same to expand and lower the liquid-level in said receptacle; and means for permitting the escape of the expanded gas after the liquid-level has been lowered through such expansion.

7. The combination of a water-motor; a pressure-tank adapted to supply a liquid under pressure to said motor; a dynamo driven by said motor; a supply-tank for receiving said liquid from said motor; a liquid-receptacle; means for permitting the flow of the liquid from said supply-tank into said receptacle but preventing a return-flow; means permitting the flow of said liquid from said receptacle to said pressure-tank but preventing a return-flow; means for admitting gas to said receptacle; electrical means for igniting said gas and causing same to expand and drive some of the liquid out of said receptacle; a float supported by the liquid in said receptacle; an exhaust-valve in the upper part of said receptacle; electromagnetic means for operating said exhaust-valve; suitable electrical connection between said float and the means for operating said exhaust-valve, so arranged that the operation of the exhaust-valve will be controlled by the position of said float; a second float operated by the pressure of the liquid in said receptacle; suitable electrical connection between said second float and said gas admission and ignition means whereby same will be controlled by the location of said second float; and suitable connection between said dynamo and all of said electrical means whereby same will be operated by power generated by said dynamo.

8. The combination of a water-motor; a pressure-tank adapted to supply a liquid under pressure to said motor; a dynamo driven by said motor; a supply-tank for receiving said liquid from said motor; a liquid-receptacle; means for permitting the flow of the liquid from said supply-tank into said receptacle but preventing a return-flow; means permitting the flow of said liquid from said receptacle to said pressure-tank but preventing a return-flow; means for admitting gas to said receptacle; electrical means for igniting said gas and causing same to expand and drive some of the liquid in said receptacle; a float supported by the liquid in said receptacle; an exhaust-valve in the upper part of said receptacle; electromagnetic means for operating said exhaust-valve; suitable electrical connection between said float and the means for operating said exhaust-valve, so arranged that the operation of the exhaust-valve will be controlled by the position of said float; a second float operated by the pressure of the liquid in said receptacle; suitable electrical connection between said second float and said gas admission and ignition means whereby same will be controlled by the location of said second float.

Signed at Chicago this 31st day of December, 1901.

CHARLES H. ROTH.

Witnesses:
WM. R. RUMMLER,
EUGENE A. RUMMLER.